(12) United States Patent
Simons et al.

(10) Patent No.: US 7,853,871 B2
(45) Date of Patent: Dec. 14, 2010

(54) SYSTEM AND METHOD FOR IDENTIFYING SEGMENTS IN A WEB RESOURCE

(75) Inventors: Kevin Simons, Cambridge, MA (US); Robert Katta, Hudson, NH (US); Mitri Abou-Rizk, Newton, MA (US); William Papp, Lincoln, MA (US)

(73) Assignee: Nokia Corporation, Espoo (FI)

( * ) Notice: Subject to any disclaimer, the term of this patent is extended or adjusted under 35 U.S.C. 154(b) by 1049 days.

(21) Appl. No.: 11/149,724

(22) Filed: Jun. 10, 2005

(65) Prior Publication Data

US 2006/0282758 A1 Dec. 14, 2006

(51) Int. Cl.
*G06F 17/00* (2006.01)
*G06F 17/10* (2006.01)

(52) U.S. Cl. .................. 715/238; 715/243; 715/244; 715/245; 715/251; 715/253; 715/255

(58) Field of Classification Search .............. 715/200, 715/204, 206–207, 210, 226–227, 229, 234, 715/236, 238, 242–243, 247, 251, 255–256, 715/267, 277
See application file for complete search history.

(56) References Cited

U.S. PATENT DOCUMENTS

| | | | | |
|---|---|---|---|---|
| 6,562,077 | B2* | 5/2003 | Bobrow et al. | 715/204 |
| 7,085,999 | B2* | 8/2006 | Maeda et al. | 715/236 |
| 2004/0049737 | A1* | 3/2004 | Hunt et al. | 715/513 |
| 2004/0054654 | A1* | 3/2004 | Nomiyama et al. | 707/1 |
| 2005/0195221 | A1* | 9/2005 | Berger et al. | 345/660 |
| 2006/0123042 | A1* | 6/2006 | Xie et al. | 707/102 |
| 2006/0230100 | A1* | 10/2006 | Shin et al. | 709/203 |

OTHER PUBLICATIONS

Deng Cai et al., VIPS: a Vision-based Page Segmentation Algorithm, Nov. 1, 2003, Microsoft Research, pp. 1-29.*
Oslo, Norway—"Powered by Opera: Opera Integrated with Adobe Creative Suite 2", Apr. 4, 2005, http://www.noticias.info/Archivo/2005/200504/20050405/20050405_56342.shtm, pp. 1-3.*
"Opera Introduces Fit-to-Window and Fit-to-Page Technology for All Screen and Paper Sizes", Nov. 23, 2004, http://www.msmobiles.com/o/news/00193.html, pp. 1-2.*
Enhancing Web Accessibility, Alison Lee, et. al., MM'03, Nov. 2-8, 2003, Berkeley, California, USA, ACM 1-58113-722-2/03/0011, 2 pgs.
Improving Pseudo-Relevance Feedback in Web Information Retrieval Using Web Page Segmentation, Shipeng Yu, et al., http://www2003.org/cdrom/papers/refereed/p300/0300-Yu.html, May 2, 2005, WWW2003, May 20-24, 2003, Budapest, Hungary, ACM 1-58113-680-3/30/0005, pp. 1-13.
VIPS: a Vision-based Page Segmentation Algorithm, Deng Cai et al., Microsoft Corporation, Nov. 1, 2003, 29 pgs.
WidSets Beta website introductory pages, Jul. 18, 2007. Printed from https://www.widsets.com.

* cited by examiner

*Primary Examiner*—Chau Nguyen
(74) *Attorney, Agent, or Firm*—Alston & Bird LLP (57) ABSTRACT

A robust, lightweight, bottom-up segmentation method for Internet content. According to the present invention, individual segments are created based upon weights assigned according to document structure and markup elements and semantics. Smaller segments are then merged into larger segments by determining which portions of the content page are related to each other. The remaining segments are then intelligently divided based upon device constraints.

23 Claims, 4 Drawing Sheets

SYSTEM AND METHOD FOR IDENTIFYING SEGMENTS IN A WEB RESOURCE

FIELD OF THE INVENTION

The present invention relates generally to the segmentation of content on an content page. More particularly, the present invention relates to the automatic segmentation of Internet content for use on devices, such as mobile telephones, that include relatively small display screens.

BACKGROUND OF THE INVENTION

The Internet is a worldwide system of computer networks in which a user at any computer can, with the proper permissions, obtain information from any other computer. Using the Internet, a user has access to millions of pages of information. Typically, Internet browsers are used to access information on the Internet. For personal computers (PC), the most popular browsers are Microsoft Internet Explorer, Opera and Firefox. One can also browse the Internet with a smaller device, such as a cellular telephone, using a micro browser such as Opera.

Web or Internet browsers are software programs that help a user navigate the Internet and access text, graphics, hyperlinks, audio, video, and other multimedia. Browsers operate by translating or interpreting hypertext mark-up language (HTML), which is the code embedded in web pages that tells the respective page how to look and behave. Browsers read this code and display the web page accordingly.

A typical Internet user visits a fairly small number of websites on a regular basis. Most websites attempt to make their pages appeal to the widest possible audience. As a result of this, average users are generally only interested in thoroughly reading some subset of the content, even on their most frequently visited sites.

On the personal computer and other large-screen devices, this form of content overload still provides a generally satisfying user experience. Users become accustomed to loading large pages and scanning over the content until they reach the sections of interest. However, on devices with more limited form-factors, such as mobile telephones and personal digital assistants, this type of casual "surfing" doesn't provide an acceptable user experience. This is because download times are often long, data transfer rates are costly and, more importantly it is very difficult to navigate pages to find the items of interest due to the small screen size.

Web pages are often an aggregation of number of small information items. These information items often occupy a small, specific area (for example, a small rectangular region) of the entire page and usually focus on a specific subject. Users could, for example, view a commercial news web site and identify many visual information items, which are also known as segments. These segments include items such as the main headline, the navigation bar, the company logo, the secondary headline, world news, local news, etc. These segments are important because content owners put a great deal of effort into grouping items to make the content easy to read and navigate. Even though this microstructure of the web page can be easily discerned by the naked eye, all of the web pages do not explicitly identify and specify segments in a way that can be used by computer programs.

Information items are useful in a number of applications. For example, one application provides for an identification mechanism for information items. Another application involves the automatic identification of static and dynamic information items in web resources. Static information items exhibit negligible or no change over time, while dynamic information items may change frequently over time. For example, on a news web page, static Information Items may include the navigation bar, the company logo, search bar, copyright notices, etc. while dynamic information items include the main headline, the secondary headlines, and individual news stories. The ability to only serve the dynamic information items (deltas) to mobile clients can decrease the download times of web content, as well as reduce resource usage of mobile terminals and congestion in wireless networks.

Existing segment identification algorithms have two main inputs: the web resource and device constraints. The output from segment identification algorithms is one or more segments. The web resource is usually an HTML page or any resource that can be transcoded to extensible HTML (XHTML) or HTML. Device constraints are a set of parameters, such as the granularity of the segment, expressed as its byte size, the visual area it occupies, the total number of segments, etc. Segments are themselves web resources (in the form of sub-documents) that can be interpreted and displayed by any browser.

The core functionality of segment identification algorithms consists of an analysis phase on the web resource, where a combination of the mark-up tags, structural aspects of the document, and layout styles are used for segment identification. Mark-up tags convey important grouping and positioning semantics. For example, in a HTML document, all of the children of the TABLE, LIST, FORM or PARAGRAPH elements have higher cohesion than the children of a BODY, an embedded OBJECT in the document is conceptually a sub document that's loosely bound to the rest of the content. The document structure, on the other hand, conveys structural information that is also useful for segmentation. Two nodes of the tree sharing a common parent are desirable candidates to be placed in the same segment, rather than two nodes that share common grandparent. Segment identification algorithms also employ cascading style sheets (CSS) styles, such as borders and background colors, for segment identification. For example, all children of a node can be placed in a segment if their node has a BORDER style.

There are currently several limitations with existing segment identification algorithms. Relying only upon the mark-up tags and the structure of a web resource has various drawbacks. Such an approach fails to account for the microstructure of the document. Taking the microstructure into account improves segmentation In addition, nodes in the document tree that are far apart, and nodes that have a weak semantic binding, can appear as neighbors when rendered by the browser. Similarly, bad HTML, which is endemic on the Internet today, compounds the problem of segment identification because the structure that the author is trying to convey is open to interpretation.

Currently, segment identification algorithms do not fully utilize the vast amount of information that is generated by the browser during document layout. Further geometrical analysis of the layout trees can reveal if segments are aligned on the left, top, right or bottom. For a given segment, it is possible to detect the neighboring segments on both the X and Y axes, as well as the distance between the corresponding edges. The greater the distance between the segment edges, the smaller is their chances of being merged. Furthermore, merging segments based on alignments will yield better results than merging based on distance thresholds or constraints such as visual size or byte size. In addition, shapes of segments can be deduced from layout trees. For example, two segments are better merge candidates if they have similar shapes and dimensions or if they form a polygon that meets the device constraints (such as display size). It is always desirable to merge segments that share similar backgrounds.

There are two types of constraints that are used for detecting segments. These are hard and soft constraints. Hard constraints are imposed by the device, such as display size and memory. Hard constraints impose restrictions on detecting new segments, combining two or more segments to form a new segment, or refining an existing segment and may result in segments that do not conform to the expectations of the end user. Soft constraints are device agnostic and allow for the discovery of natural structure of the web resource, such as number of segments.

Web content authors employ a number of techniques to achieve a desired layout, as well as the look and feel for a web resource. For example, web page authors use transparent images in order to adjust the spacing between content. This results in large segments with very little content or empty with no content. In addition there are no constructs in HTML to determine if the image was used for spacing purposes. This implies that the image must be downloaded regardless of whether it is actually visible to the user. Using a second technique, HTML content authors often do not specify the title of paragraphs with a header element. Instead, they mark the content with a bold or font tag to create the effect of the title. The paragraph usually is rendered below the title and it is positioned in a way to create a grouping effect. When such content is segmented, the title and the content may end up in different segments.

The HTML table layout can also be used to display content in a tabular fashion to the user. Even though the tables support a notion of column headers, these mechanisms are rarely used to specify column headers for tabular content. In practice, the column headers might end up in an entirely different table, as a cell within a table, or be aligned with the data, thereby ending up in separate segments. In a fourth technique, authors use a combination of absolute positing, alignment, text styling, etc. to display content as a list. When such content is segmented, the list items may end up in independent segments.

The segmentation of web resources, when performed on a mobile device, presents a unique set of problems in terms of memory and performance. Due to these concerns, a segmentation algorithm on a mobile device should be able to work on the data stream, processing data as it arrives rather than once all of the content has been downloaded. Segment identification algorithms currently output one or more segmented web resource. Outputting segment identifiers that are a high level description of segments can be used to uniquely identify and extract the segment from the web resource. This saves computational and power resources on mobile devices.

SUMMARY OF THE INVENTION

The present invention provides for an improved system and method for the segmentation of web content. According to the present invention, the web resource at issue is analyzed from several facets in order to obtain the respective segment identifiers. Information obtained from each facet is encoded as a set of weights on the document nodes. The weight of each node is equal to the sum of its weight and the combined total weight of all of its parents, going back to the root node. Each node is placed into an existing segment if the difference between its weight and the average weight of the segment is less then a predetermined threshold. If the difference meets or exceeds the predetermined threshold, a new segment is created to hold the node. Segments are further refined based on CSS and geometry values and defined device constraints.

With the present invention, segmentation is capable of running entirely on a mobile device, which can provide very beneficial interaction models for mobile uses. The present invention also works on HTML data as it arrives at the device, in contrast to systems where a great deal of processing must occur after all of the content has been downloaded. This dramatically improves the overall performance of the algorithm and leads to an improved end user experience by displaying the segments as the data arrives. On a related note, the present invention involves the building of larger and larger segments, which is in contrast to conventional systems which begin with large segments and divide them into smaller ones, which is substantially less "lightweight" than the present invention.

In addition to the above, the algorithm of the present invention is based heavily upon geometry and the layout tree instead of a pure HTML-style analysis. Poorly written HTML has no impact on the result of the algorithms of the present invention. This is important because there are a wide variety of ways to author and structure HTML, and some methods are better than others. Regardless of the method, however, the layout always has clearly defined segments which can be visually identified. Therefore, the present invention's use of the defined segments eliminates potential problems created by poor HTML use. Lastly, the approach of the present invention is highly resilient to the modification of HTML content by JavaScript. When JavaScript modifies content in the browser, new nodes are attached to the rendering tree and the old nodes are removed. This is exactly the same process that occurs when the original HTML is parsed and rendered.

The present invention can be used to divide a webpage into information items which are useful in many ways. For example, users can download only portions of the web page that they are interested in. This saves bandwidth because only dynamic items are loaded. In another example, one can browse the web page by going from item to item. This improves content navigation on mobile devices. In another example, the best match information item, rather than the whole webpage, can be returned as a result to a query search. In another example, the ability to divide a webpage into information items will enable the removal of noise items such as logos, copyright declarations, banners, pop-ups, etc. Compared to conventional and/or existing algorithms, the present invention provides for a more robust and light-weight solution. The system of the present invention can permit a user to, when performing a search, view only the relevant information items in the search results, as well as to navigate between search results without having to go back to a search results listing.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
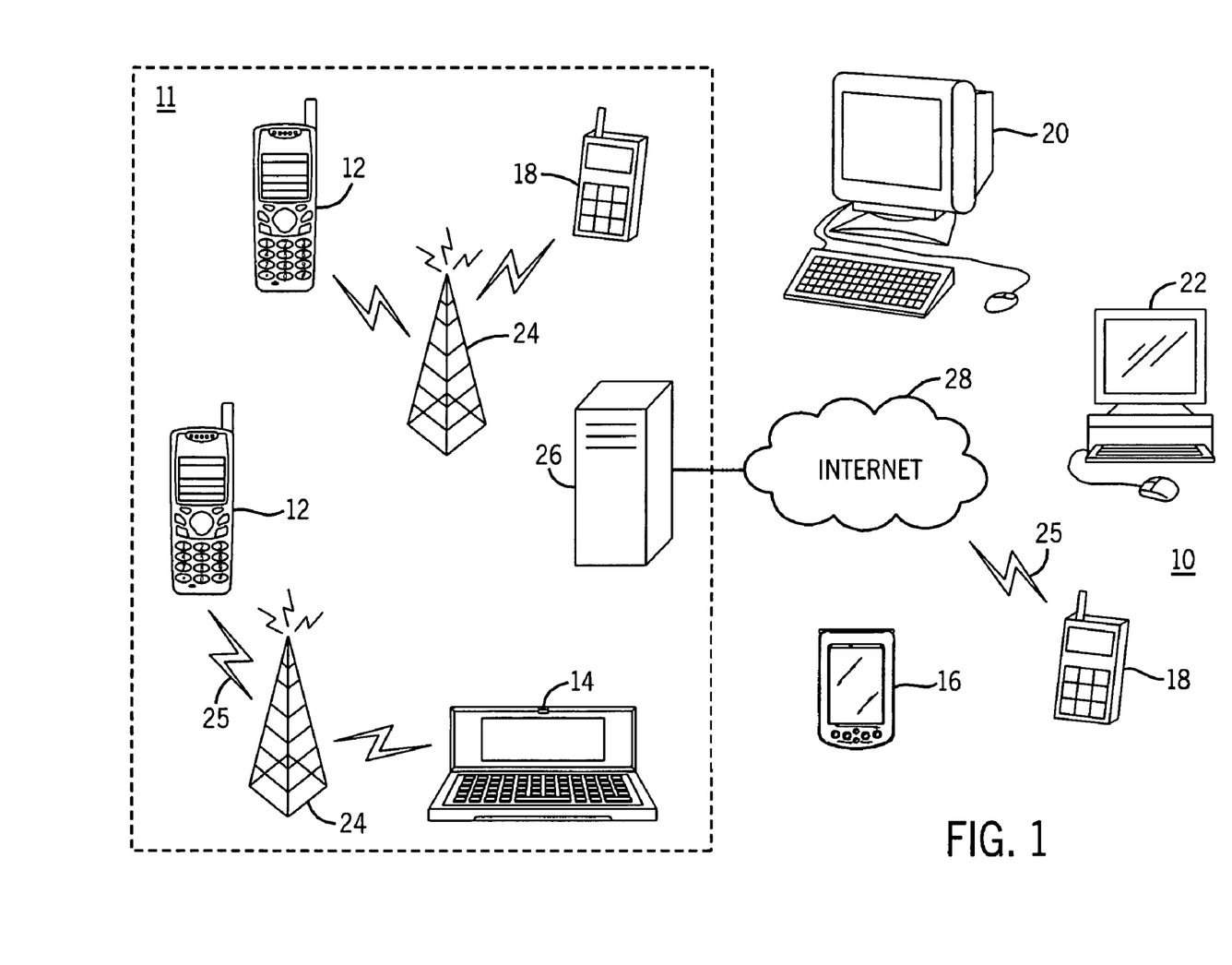
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
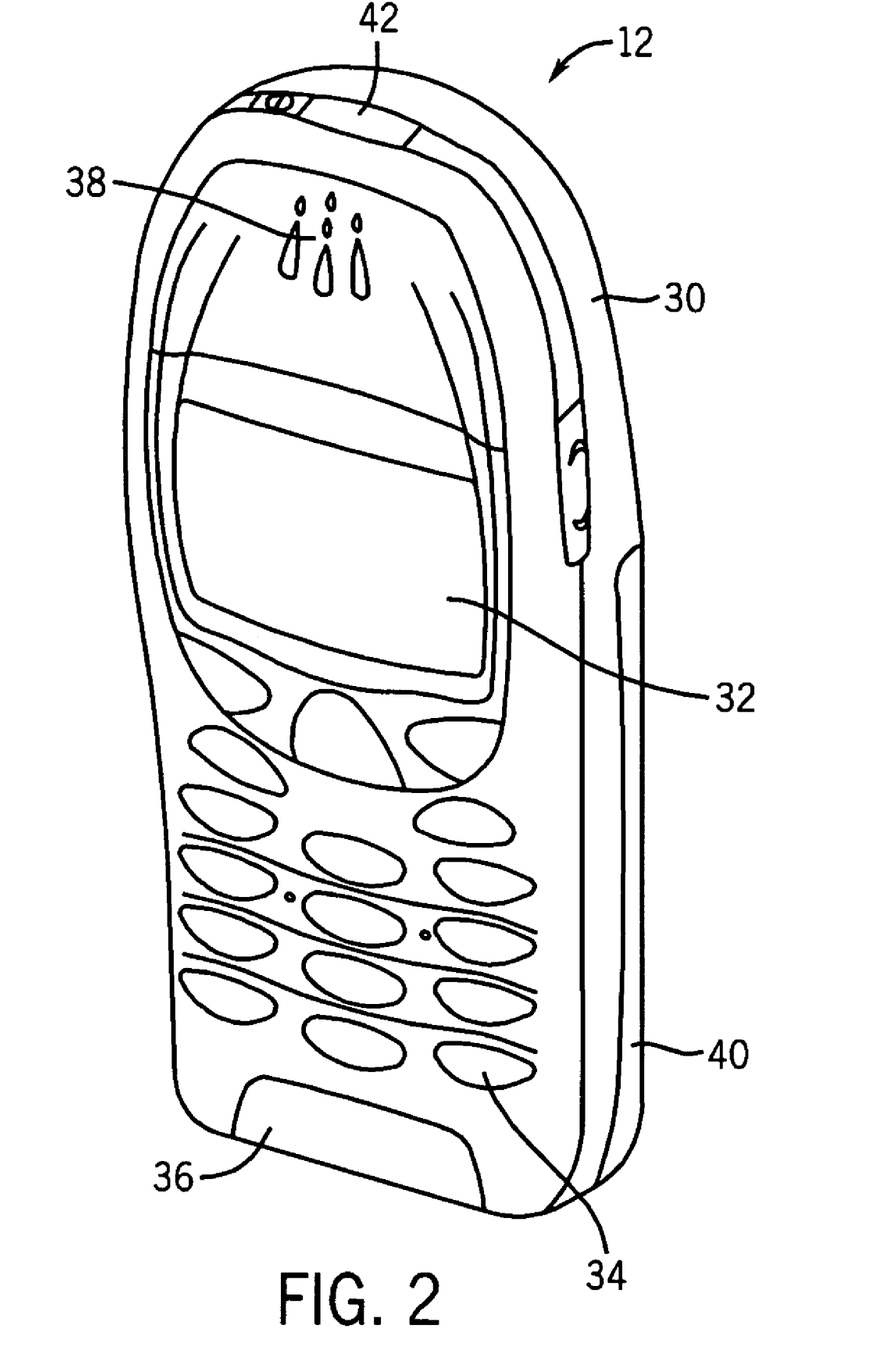
FIG. 2 is a perspective view of a mobile telephone that can be used in the implementation of the present invention.
Figure 3:
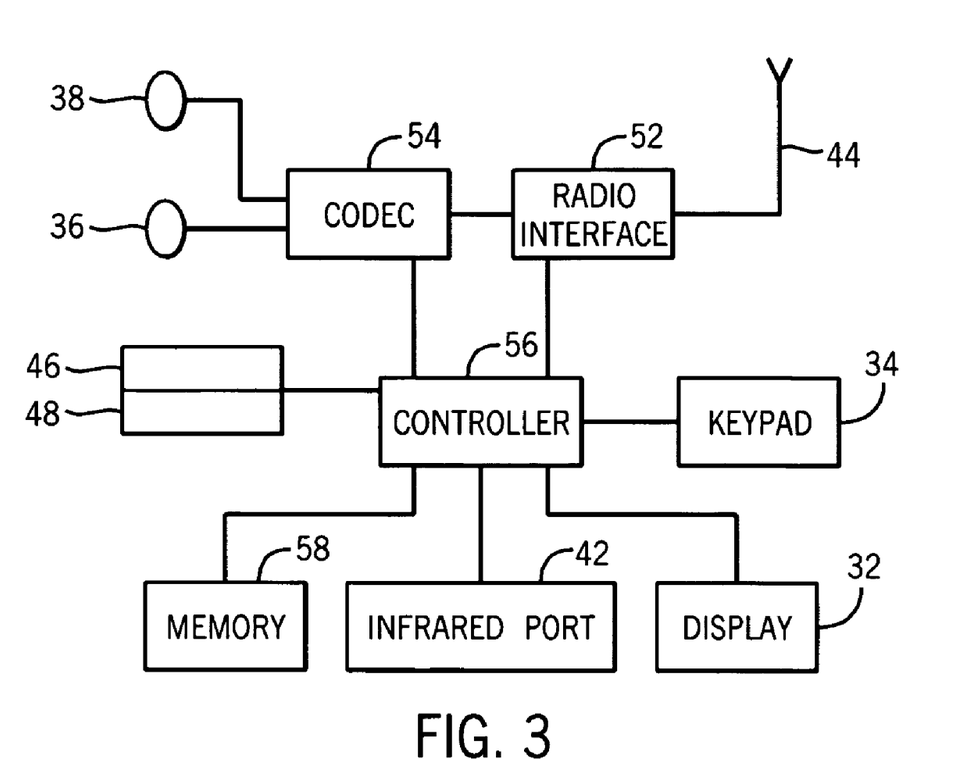
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The preset invention involves the use of a hybrid approach for segmenting content such as Web content. The approach of the present invention involves the analyzing of the web resource from several facets in order to obtain the segment identifiers. Information obtained from the facet is encoded as a set of weights on the document nodes. The weight of each node is equal to the sum of its weight and the combined total weight of all of its parents, going all of the way back to the root node.

In the initial phase, all of the nodes have two weights. The first weight is based on the node's HTML tag. To find a node's weight, the weight of the node's parent is taken and added to the value for the particular HTML tag. For example, if a parent had a weight of 40, and the node being examined is a TD, then the node is assigned an HTML weight of 40+20 (where 20 is the HTML weight for a TD). The second weight is a document object model (DOM) weight, which is simply the depth of the node in the DOM tree. The root has depth of 0.

Each node is placed into an existing segment if the difference between its weight and the average weight of the segment (the confidence value) is less then a predetermined threshold, or new segment is created to hold the node if the difference is not less than the threshold.

The present invention considers five principal facets: (1) the document structure; (2) mark-up element semantics; (3) style transformations on the document with CSS; (4) the document layout; and (5) web patterns. Each of these facets is discussed herein.

XML documents inherently possess a tree structure. There are several procedures that could be applied on the document trees for segment identification. For example, nodes that share a common parent or a grand parent can receive a greater weight than nodes that do not share such a relation. Additionally, nodes can be accepted or rejected for segments based upon the tree depth metric. The addition of a new node to a segment would only be possible if the change to the average tree depth of the segment falls within a certain threshold.

Mark-up element semantics are encoded as a set of weights for each node in the document tree. These weights are classified as strong, medium or weak. Two nodes that have similar mark-up weights usually end up in the same segment. More particularly, if two nodes include several common ancestors with strong weights, then the two nodes will likely have fairly similar weights and be placed in the same segment. Examples of elements that receive a strong weight are TABLE, TABLE CELL or TABLE ROW elements, FORM elements, DIV elements, ANCHOR elements, etc.. Medium weights are given to text styling elements such as PARAGRAPH, BOLD, ITALIC, FONT, etc.. Weak weights are provided to elements such as BODY, SCRIPT, etc. CSS-based weights are encoded as a tuple. CSS styles include tables, background color, background images, border widths, border colors, CSS absolute positions, and layers. Individual segments also tend to maintain their index within a page, even though the content within the segment may change.

Layout trees are used to calculate the geometric distance from one node to another. This information can be used to determine if the nodes belong to the same segment. An alignment of nodes indicates strong content cohesion. White space and spacing constructs illustrate loose cohesion among content. Shapes of segments can be deduced from the layout trees; two segments are better merge candidates if they have similar shapes and dimensions, or if they form a polygon that meets the constraints. It is always desirable to merge segments that share similar backgrounds.

Web patterns are reoccurrences of observable characteristics in the content. Identifying patterns can be very useful in refining a segmentation algorithm of the present invention. Web patterns can be used to identify other items. For example, web patterns can be used to identify transparent images used for formatting. Transparent images can be identified by searching all of the images within the content. Such images occupy a very small area, appear as thin strips that are very long and slim, and typically utilize the same URL. Additionally, images that are transparent and used for spacers can be detected and removed from their clusters.

Headers of content can be determined by a simple pattern matching technique based upon geometry. For every segment, if there is a neighboring segment above it that occupies a much smaller area, and if both of the segments are left aligned, then both segments can be collapsed into a larger segment. Similar pattern matching techniques can be used with segments that are to the left or right of each other while being top aligned.

Web patterns can also be used to identify bulleted and non-bulleted lists of items. Aligned lists of items are detected and merged into the same segment. This pattern supports both bulleted (either with <LI> tags or with explicit bullet characters) and non-bulleted lists.

Furthermore, web patterns can also be used to identify pictures for captions. Using patterns of this type is useful in identifying images in the page and detecting if text exists below the image that might be its caption. If so, the segments containing the image and the caption can be merged together.

Segment identifiers are essentially descriptors that can be used to identify and extract the segment from the web resource. The descriptors include a set of path expressions over the document structure, style extractors over layout tree and CSS, etc.

Figure 4:
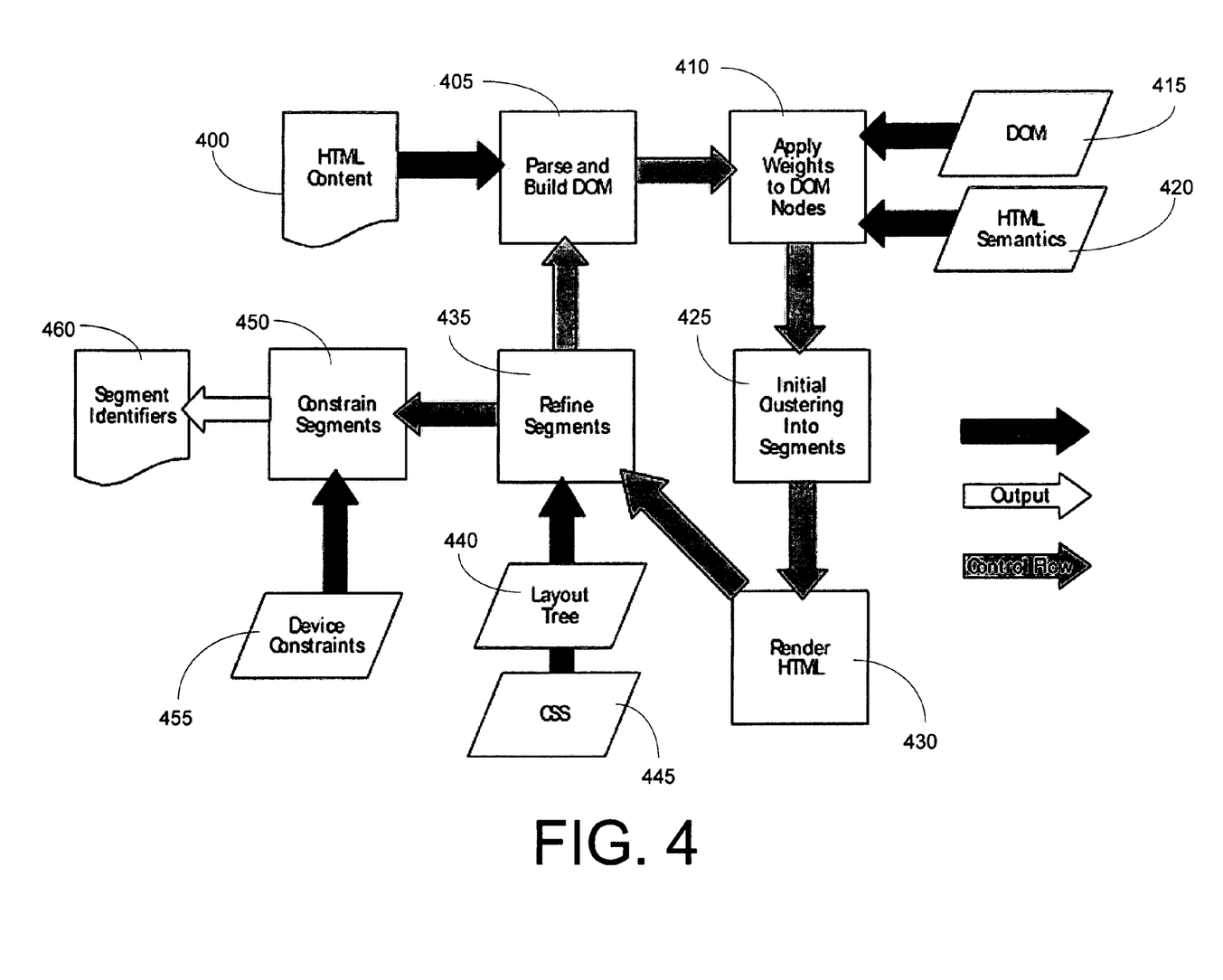
FIG. 4 is a flow chart showing the general process involved in the implementation of the present invention.

Segmentation according to the present invention occurs in three distinct phases: (1) initial clustering; (2) cluster refinement; and (3) the application of device constraints. This process is represented in FIG. 4. In the initial clustering phase, HTML content items in the web page 400 are input, and document object models (DOM) are parsed and built at step 405.

Initial clustering generally only uses the HTML and DOM weights, not CSS. In initial clustering, the system generally keeps track of only the "current" cluster. This cluster contains, at a minimum, the previous node that was examined and possibly several other nodes. The system then looks at the DOM and HTML weights of the current node being examined and compares them to the average weights of the cluster. Each segment's HTML and DOM weights are the mean of the HTML and DOM weights of its constituent nodes in one embodiment of the invention. The differences between the DOM and HTML weights of the current node and the average weight of the cluster weights is used in a "confidence formula" to determine the level of confidence that this node belongs in the current cluster. The confidence value starts at 1.0, and the following items are subtracted from it: (htmlDiff*HTML_FACTOR+domdiff*DOM_FACTOR), where htmlDiff and domDiff are the difference in the weights and HTML_FACTOR and DOM_FACTOR are the weighting factors. Good values are, for example, 0.07 and 0.05.

An additional structural test is also taken into account during the initial clustering. The system keeps track of the common ancestor of all of the nodes in a given cluster. Then when determining whether or not to include a new node, the system checks how far up the tree the common ancestor will have to move in order to include this new node. This provides information concerning how "structurally related" the new node is to the existing cluster. Again, this distance is used to deduct from the confidence: confidence= (DIST_FACTOR*dist), where dist is how far up the tree the ancestor will move and DIST_FACTOR is a weighting factor (0.06).

The system of the present invention can initiate initial clustering as soon as the browser begins parsing the HTML. The initial clustering can also be delayed until the page has been fully loaded and rendered. This results in the ability to use page geometry and layout in initial clustering. The distance between the center point of the new node and the AVERAGE center point of the current cluster is then determined. This distance is normalized by dividing it by the standard deviation of the cluster. This distance is also deducted from the confidence.

In an alternative embodiment of the present invention, in the initial clustering, the confidence value starts at 0, and differences in weights, distances, etc. cause the confidence value to increase.

At step 410 in FIG. 4, weights are applied to DOM nodes based upon input DOM's 415 and HTML semantics 420. At step 425 the HTML content items are grouped or clustered into segments. The HTML is then rendered at step 430. Once these initial clusters have been constructed, cluster refinement takes place in several distinct phases at step 435, including the application of the layout tree (440), refinement of web patterns, refinement based upon CSS (445), and refinement based upon geometry.

Web patterns allow for logically related items in the page to be merged with each other. Cascading Style Sheets are used by web content developers to advise the viewer as to which portions of the page are related. During this phase, these same clues are programmatically taken into account in order to further group the segments. Finally, layout information is used to generate geometric data about the segments. This geometry can be used to determine physical relationships between the segments in the document. This refinement stage takes smaller segments in the document and merges them into larger segments, while still taking the device constraints into account.

The final phase of the segmentation, the constraining of segments (step 450), takes into account a specified set of constraints imposed by the device, such as screen size. Using these device constraints (455), the algorithm verifies each segment to see if the constraints are met. If the constraints are not met, then the algorithm breaks the segment down into several logical sub-segments by relaxing the thresholds. The algorithm then repeats the verification on the sub-segments. This process is repeated until the document contains only valid segments. The final segment identifiers are output at step 460.

The algorithm described above can be implemented in one of two ways. The first way involves the use of a stream-based approach. As HTML arrives at the device, it is parsed by the browser, and segments are created on-the-fly. As the data arrives, all three of the steps (initial cluster, refinement and device constraints) can be run at regular intervals, creating a very efficient segmentation. Results in this version may be less deterministic than the blocking method discussed below, but there is a large performance and resource usage benefit.

The second approach for implementing the algorithm of the present invention is a blocking approach. In this approach, the segmentation is not performed until all of the HTML data has been downloaded by the device and has been parsed and rendered by the browser. While this approach yields lesser performance than the stream-based approach, the segmentation is much more deterministic than in the steam-based approach.

Once the segmentation process has been completed, a user can perform a variety of search functions using the information items based upon the created segments. For example, a search algorithm can use the granularity of a Web search result to present the user only with information items that contain relevant information. In this embodiment, for example, a system implementing the search feature can ignore information items containing information such as company logos, while providing the user with those information items that contain content that is directly relevant to the user's search request.

Our method for searching content includes a user interaction model that permits end users to quickly loop through a finite set of information items in a manner similar to how an individual can brose television channels using a remote control. In this model, information items are presented one by one to the end user through a simple one-click navigation interface. To navigate from one information item to another, the end user can actuate a "next" feature. The device can present this primitive to the user as a softkey, an inline anchor as a button in the toolbar, an HTML link, or as another feature.

As an example of this search mechanism, if a query of a search engine is: "restaurants in downtown San Francisco," instead of returning a list of search results to the end user, the query will return the first relevant "Information Item" to the end user, with the possibility for the user to move to the next item with a single click. The next item may be considered on the same web resource or on a different web resource depending upon the particular system requirements.

The user can use the information items in various ways. For example, the user can view one information item at a time, requesting the next information item by pressing a "next" button on his client device 510. The user can also bookmark or print individual information items or use "one click" navigation between information items.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. For example, but without limitation, the present invention can be used in conjunction with virtually any type of document, including but not limited to .pdf documents, Microsoft Word documents, Microsoft PowerPoint documents, etc. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
grouping, by a processor, items on a content page into segments in response to weightings of individual nodes associated with respective items being within a predetermined threshold difference of an average weighting for a respective segment;
merging smaller segments into larger segments based upon predefined criteria, the smaller segments and the larger segments being segments formed by the grouping of the items,
wherein merging the smaller segments into the larger segments includes merging a first segment into a second segment when the second segment neighbors the first segment either above, below, to the left, or the right of the first segment, and the first segment and the second segment are either left or top aligned; and
dividing segments formed by the grouping of items that fail to meet predefined constraints into sub-segments, until the sub-segments meet the predefined constraints.

2. The method of claim 1, wherein the predefined constraints comprise constraints within an electronic device that is being used to display the content page.

3. The method of claim 2, wherein the predefined constraints include the size of the screen on the electronic device.

4. The method of claim 1, wherein the weight of each node is equal to the sum of its own weight and the combined total weight of its parent nodes going back to a root node.

5. The method of claim 1, wherein nodes with similar weights are placed within the same segment.

6. The method of claim 1, wherein, if a node is not included in an existing segment, then a new segment is created to hold the node.

7. The method of claim 1, wherein the merging of smaller segments into larger segments includes merging segments that possess similar shapes.

8. The method of claim 1, wherein the merging of smaller segments into larger segments includes: identifying an image in the content page;
detecting text existing below the image; and merging the segments containing the image and the detected text.

9. The method of claim 1, wherein the merging of smaller segments into larger segments includes: identifying an aligned list of items; and merging each of the segments containing at least one of the aligned list of items into the same segment.

10. The method of claim 1, wherein each of the segments is assigned an index value based upon underlying content for that particular segment, and wherein the index value for a segment remains constant despite minor modifications in the underlying content.

11. The method of claim 1, wherein the merging of smaller segments into larger segments includes merging segments that share similar backgrounds.

12. The method of claim 1 wherein the merging of smaller segments into larger segments includes the use of cascading style sheets.

13. The method of claim 1, wherein items are not grouped into segments until the entire content page has been downloaded from a remote location.

14. The method of claim 1, wherein items are grouped into segments at the same time as the entire content page is being downloaded from a remote location.

15. The method of claim 1, further comprising, upon receiving a search request from a user, using a search algorithm to provide to the user only segments and sub-segments that contain information relevant to the search request.

16. A computer program product comprising a computer-readable memory, the computer-readable memory having executable computer code stored thereon, the computer code comprising:
  computer code for grouping items on a content page into segments in response to weightings of individual nodes associated with respective items being within a predetermined threshold difference of an average weighting for a respective segment;
  computer code for merging smaller segments into larger segments based upon predefined criteria, the smaller segments and the larger segments being segments formed by the grouping of the items,
  wherein the computer code for merging the smaller segments into the larger segments includes merging a first segment into a second segment when the second segment neighbors the first segment either above, below, to the left, or the right of the first segment, and the first segment and the second segment are either left or top aligned; and
  computer code for dividing segments formed by the grouping of items that fail to meet predefined constraints into sub-segments, until the sub-segments meet the predefined device constraints.

17. The computer program product of claim 16, wherein the weight of each node is equal to the sum of its own weight and the combined total weight of its parent nodes going back to a root node.

18. The computer program product of claim 16, wherein the weight of a segment is based upon the relationship between nodes within the segment, and wherein closely related nodes possess a higher weight than less closely related nodes.

19. The computer program product of claim 16, further comprising computer code for, upon receiving a search request from a user, using a search algorithm to provide to the user only segments and sub-segments that contain information relevant to the search request.

20. An apparatus comprising at least one processor and at least one memory including computer program code, the at least one memory and the computer program code configured to, with the at least one processor, cause the apparatus at least to perform:
  grouping items on a content page into segments in response to weightings of individual nodes associated with respective items being within a predetermined threshold difference of an average weighting for a respective segment;
  merging smaller segments into larger segments based upon predefined criteria, the smaller segments and the larger segments being segments formed by the grouping of the items,
  wherein the computer code for merging the smaller segments into the larger segments includes computer code for merging a first segment into a second segment when the second segment neighbors the first segment either above, below, to the left, or the right of the first segment, and the first segment and the second segment are either left or top aligned; and
  dividing segments formed by the grouping of items that fail to meet predefined constraints into sub-segments until the sub-segments meet the predefined constraints.

21. The apparatus of claim 20, wherein the weight of each node is equal to the sum of its own weight and the combined total weight of its parent nodes going back to a root node.

22. The apparatus of claim 20, wherein the apparatus is further caused to perform, upon receiving a search request from a user, using a search algorithm to provide to the user only segments and sub-segments that contain information relevant to the search request.

23. A system comprising:
  a communications device configured to transmit a content page; and
  an electronic device in communication with the communications device the electronic device including a processor and a memory operatively connected to the processor, the memory comprising:
  computer code for grouping items on a content page received from the remote terminal into segments in response to weightings of individual nodes associated with respective items being within a predetermined threshold difference of an average weighting for a respective segment;
  computer code for merging smaller segments into larger segments based upon predefined criteria, the smaller segments and the larger segments being segments formed by the grouping of the items,
  wherein the computer code for merging the smaller segments into the larger segments includes computer code for merging a first segment into a second segment when the second segment neighbors the first segment either above, below, to the left, or the right of the first segment, and the first segment and the second segment are either left or top aligned; and
  computer code for dividing segments formed by the grouping of items that fail to meet predefined constraints into sub-segments until the sub-segments meet the predefined device constraints.

* * * * *